United States Patent

Ryan et al.

[11] Patent Number: 5,823,610
[45] Date of Patent: Oct. 20, 1998

[54] DRAG REDUCING APPARATUS FOR A VEHICLE

[75] Inventors: William J. Ryan, Danville, Ill.; J. Barry Ryan, Rochester, N.Y.; Patrick E. Ryan, Aurora, Ohio

[73] Assignees: James C. Ryan, Akron, N.Y.; Thomas J. Ryan, Absecon, N.J.

[21] Appl. No.: 955,225

[22] Filed: Oct. 22, 1997

[51] Int. Cl.⁶ .................................................. B62D 35/00
[52] U.S. Cl. ......................................................... 296/180.4
[58] Field of Search .......................................... 296/180.4

[56] References Cited

U.S. PATENT DOCUMENTS

| | | |
|---|---|---|
| 4,006,932 | 2/1977 | McDonald . |
| 4,142,755 | 3/1979 | Keedy . |
| 4,236,745 | 12/1980 | Davis . |
| 4,257,641 | 3/1981 | Keedy . |
| 4,601,508 | 7/1986 | Kerian . |
| 4,688,841 | 8/1987 | Moore ................................. 296/180.4 |
| 4,702,509 | 10/1987 | Elliott . |
| 4,741,569 | 5/1988 | Sutphen . |
| 4,978,162 | 12/1990 | Labbé ................................. 296/180.4 |
| 5,058,945 | 10/1991 | Elliott et al. ...................... 296/180.4 |
| 5,498,059 | 3/1996 | Switlik ............................... 296/180.4 |

FOREIGN PATENT DOCUMENTS

| | | | |
|---|---|---|---|
| 2509681 | 1/1983 | France .................................. 296/180.4 |
| 3115742 | 11/1982 | Germany ............................. 296/180.4 |

*Primary Examiner*—Gary C. Hoge
*Attorney, Agent, or Firm*—Vickers, Daniels & Young

[57] ABSTRACT

Drag reducing apparatus for the rear end of a road vehicle such as a truck or trailer comprises a storage container in which an inflatable bladder is rolled on a support shaft for displacement relative to the container between a stored position and a deployed position in which the inflatable bladder covers the rear surface of the vehicle and is inflatable to provide an aerodynamic contour extending rearwardly of the vehicle. The inflatable bladder is extendable and retractable relative to the container by cables having ends attached to the container shaft and opposite ends connected to a cable shaft, whereby rotation of the latter pulls the inflatable bladder from the container and rotation of the container shaft in the opposite direction rewinds the bladder into the container for storage. Guide and support tracks and a spring clip arrangement hold the periphery of the bladder against the rear surface of the vehicle when the bladder is in its deployed position.

18 Claims, 8 Drawing Sheets

DRAG REDUCING APPARATUS FOR A VEHICLE

BACKGROUND OF THE INVENTION

This invention relates to the art of inflatable drag reducing devices for land vehicles and, more particularly, to improvements with respect to storing and deploying such devices.

It is of course well known that the box shape of trucks and the trailer of tractor-trailer combinations is the result of a need to optimize cargo space therewithin, and it is likewise well known that the boxlike configuration is not aerodynamically efficient and that the aerodynamic drag resulting from the box shape accounts for a considerable percentage of the fuel consumption of large trucks and tractor-trailer combinations during highway operation thereof. In an effort to improve the operating efficiency of such vehicles, the tops of the cabs of trucks and tractors and the upper forward ends of trailers have been provided with a wide variety of wind foil devices. For the same purposes, the rear ends of trucks and trailers have been provided with inflatable streamlining and drag reducing devices or bladders such as those shown, for example, in U.S. Pat. Nos. 4,006,932 to McDonald, 4,601,508 to Kerian, 4,702,509 to Elliott, and 4,741,569 to Sutphen. Air foils mounted on the cabs of trucks and trailers can be rigid and permanent in character in that the areas on which the air foils are mounted do not need to be accessed in connection with use or operation of the vehicle. On the other hand, the rear ends of trucks and trailers do have to be accessible in that they are closed by doors providing access to the interior thereof for loading and unloading purposes. Accordingly, streamlining and drag reducing devices designed for use on the rear ends of trucks and trailers either have to be detachable as shown in the patent to Elliott or provided individually on the doors of the trailer as shown in the other patents referred to above. If the Elliott device is not going to be used it would have to be stored somewhere in the vehicle or, in the manner of the devices disclosed in the patents to McDonald, Kerian and Sutphen, merely deflated and allowed to remain on the door. Removal and storage is a time-consuming operation in addition to requiring storage space, and permanent mounting of the inflatable device on the truck or trailer doors undesirably exposes the device to adverse weather and other conditions during times of non-use of the device. The exposed device is also subject to other potential damage, such as by vandalism, and it will be appreciated that such exposure and potential damage shortens the life of the inflatable device.

SUMMARY OF THE INVENTION

In accordance with the present invention, an inflatable drag reducing apparatus is provided which minimizes or overcomes the foregoing and other problems encountered in connection with drag reducing arrangements heretofore available. More particularly in accordance with the present invention, an inflatable, streamlining bladder is stored in a container mounted exteriorly of the rear end of a truck or trailer, and an arrangement is provided for displacing the inflatable bladder from its stored position to a deployed position overlying the rear face of the vehicle. When so positioned, the bladder is inflated to provide an aerodynamic shape extending rearwardly of the vehicle and, when it is desired to access the rear doors of the vehicle, the inflatable bladder is deflated and the displacing arrangement is operated to return the bladder to the container. Preferably, the inflatable bladder is stored in a rolled condition and deployment and return of the bladder relative to the container is achieved through a cable and bladder unwinding and rewinding arrangement, whereby the latter operations are quickly and efficiently achieved and can be achieved by a single operator. Storage, deployment and return of the inflatable bladder relative to a container mounted on the vehicle advantageously provides for protecting the inflatable bladder from exposure to vandalism, adverse weather conditions and the like during periods of non-use, and enables the storage to be achieved without encroaching on the storage space within the vehicle. Of further advantage in connection with the present invention is the fact that the storage container can be mounted on the rear end of a truck or trailer adjacent a vertical side edge thereof or adjacent the top or bottom edge thereof. This advantageously enables selectivity and versatility with respect to mounting and use of the inflatable device, and use thereof with a variety of designs or particular structural features of a given vehicle. In this respect, for example, the container can be mounted adjacent the upper or lower edges of the rear surface of a vehicle having horizontally swinging doors, and can be mounted adjacent the latter edges or the vertical side edges of a vehicle having a roll-up door.

It is accordingly an outstanding object of the invention to provide an improved drag reducing apparatus of the type including an inflatable bladder for providing an aerodynamic contour extending rearwardly from a truck or trailer.

Another object is the provision of apparatus of the foregoing character in which the inflatable bladder is stored in a container mounted exteriorly of the vehicle and relative to which the bladder is displaceable between stored and deployed positions.

Yet another object is the provision of apparatus of the foregoing character in which displacement of the inflatable bladder to the use position thereof on the truck or trailer and displacement of the bladder from the use to a stored position is achieved quickly and efficiently.

Still a further object is the provision of apparatus of the foregoing character in which protection for and thus the expected life of the inflatable bladder is optimized.

Another object is the provision of apparatus of the foregoing character in which the container for the inflatable bladder is selectively mountable in a variety of locations on a truck or trailer, thus to optimize use of the apparatus with trucks and trailers having different rear end structures and configurations.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawings in which.

DESCRIPTION OF PREFERRED EMBODIMENTS

Figure 1:
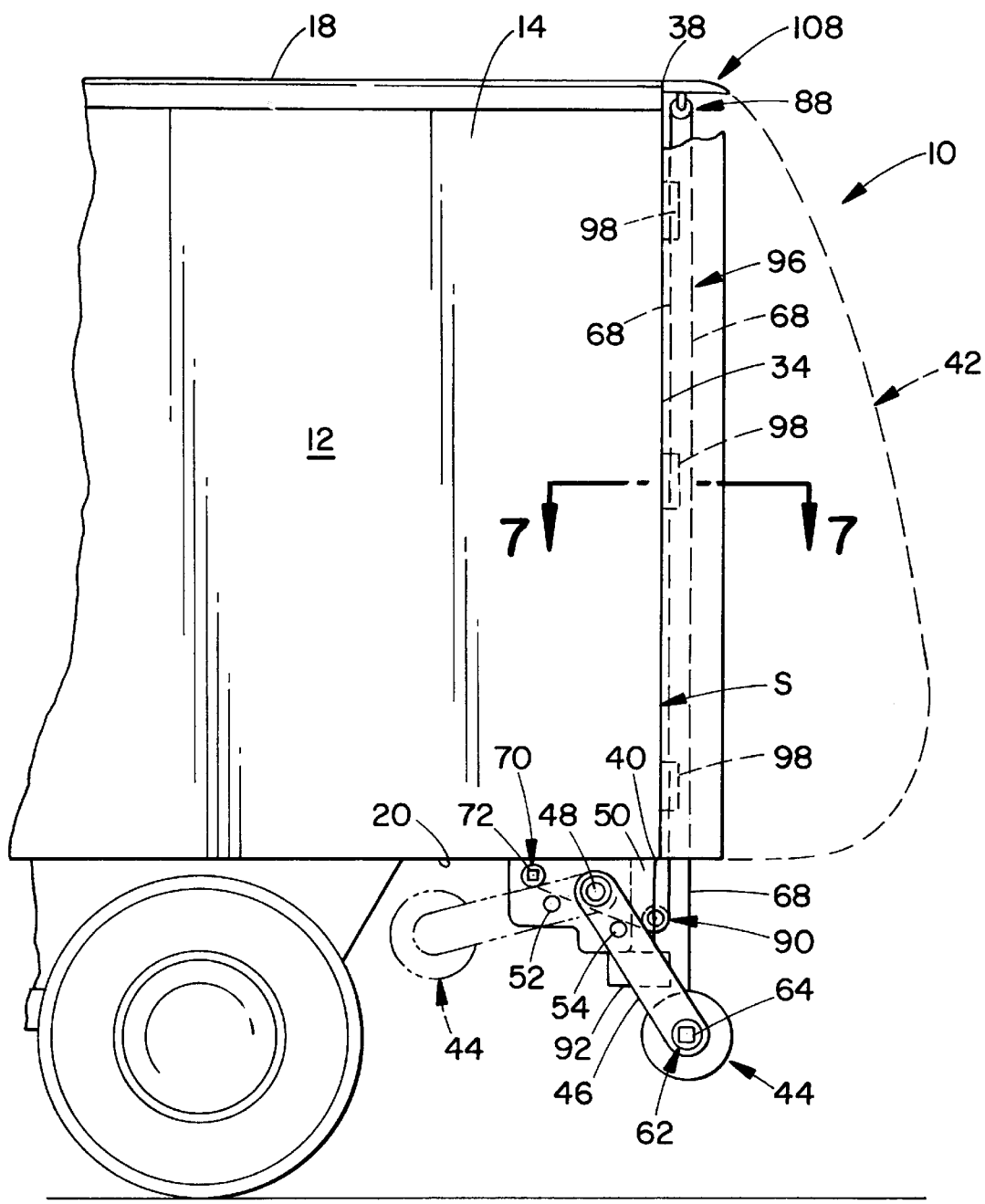
FIG. 1 is a side elevation view of the rear portion of a trailer having drag reducing apparatus in accordance with the present invention mounted thereon.

Referring now in greater detail to the drawings, wherein the showings are for the purpose of illustrating preferred embodiments of the invention only, and not for the purpose of limiting the invention, FIGS. 1–4 illustrate drag reducing apparatus 10 in accordance with the invention mounted on rear end 12 of a motor vehicle such as the trailer of a tractor-trailer combination and which rear end has an opposed pair of parallel vertical side walls 14 and 16 and opposed parallel top and bottom walls 18 and 20, respectively. Rear end 12 further includes a generally flat upwardly extending rear surface which, in the embodiment illustrated, is defined by rear doors 22 and 24 and peripheral trailer frame portions 26, 28, 30, and 32 which are coplanar with and extend about doors 22 and 24. In the embodiment illustrated, doors 22 and 24 are respectively mounted on frame portions 26 and 30 by hinges, not illustrated, such that the doors are horizontally pivotal about vertical hinge axes between the closed positions shown in the drawing and open positions in which the doors extend laterally outwardly and, preferably, forwardly of the trailer frame portions when in the fully opened position. Walls 14, 16, 18, and 20 of rear end 12 intersect the rear surfaces of the rear end to provide an opposed pair of parallel vertical edges 34 and 36 and an opposed pair of parallel horizontal edges 38 and 40.

In the embodiment illustrated in FIGS. 1–4, drag reducing apparatus 10 includes an inflatable bladder 42 stored in a container 44 therefor when not in use and which container is mounted on rear end 12 as described in greater detail hereinafter. Bladder 42 is adapted to be displaced from container 44 to a deployed position overlying rear surface S of the trailer between edges 34, 36, 38, and 40 and, in the latter position, is adapted to be inflated to provide an aerodynamic contour extending rearwardly of the vehicle as schematically illustrated in FIG. 1. More particularly with regard to the support and displacement of bladder 42 between the stored and deployed positions thereof, storage container 44 is mounted beneath bottom wall 20 of the trailer by a pair of support arms 46 at the laterally opposite ends of container 44 and to which the container is suitably secured against rotation. Each of the arms 46 has an upper end pivotally interconnected by means of a pin 48 with a corresponding mounting plate 50 on the underside of bottom wall 20, whereby container 44 is pivotal between a bladder deploying position and a stowed position, respectively shown by solid and broken lines in FIG. 1. Each of the mounting plates 50 is provided with a pair of lock pin openings 52 respectively corresponding to the stowed and deployed position of arms 46 and, as will be appreciated from FIG. 1, each of the arms 46 is provided with a lock pin opening, not designated numerically, alignable with openings 52 in the corresponding arm position for receiving a removable lock pin 54 by which the arms and thus container 44 are releasably held in the corresponding container position.

Figure 3:
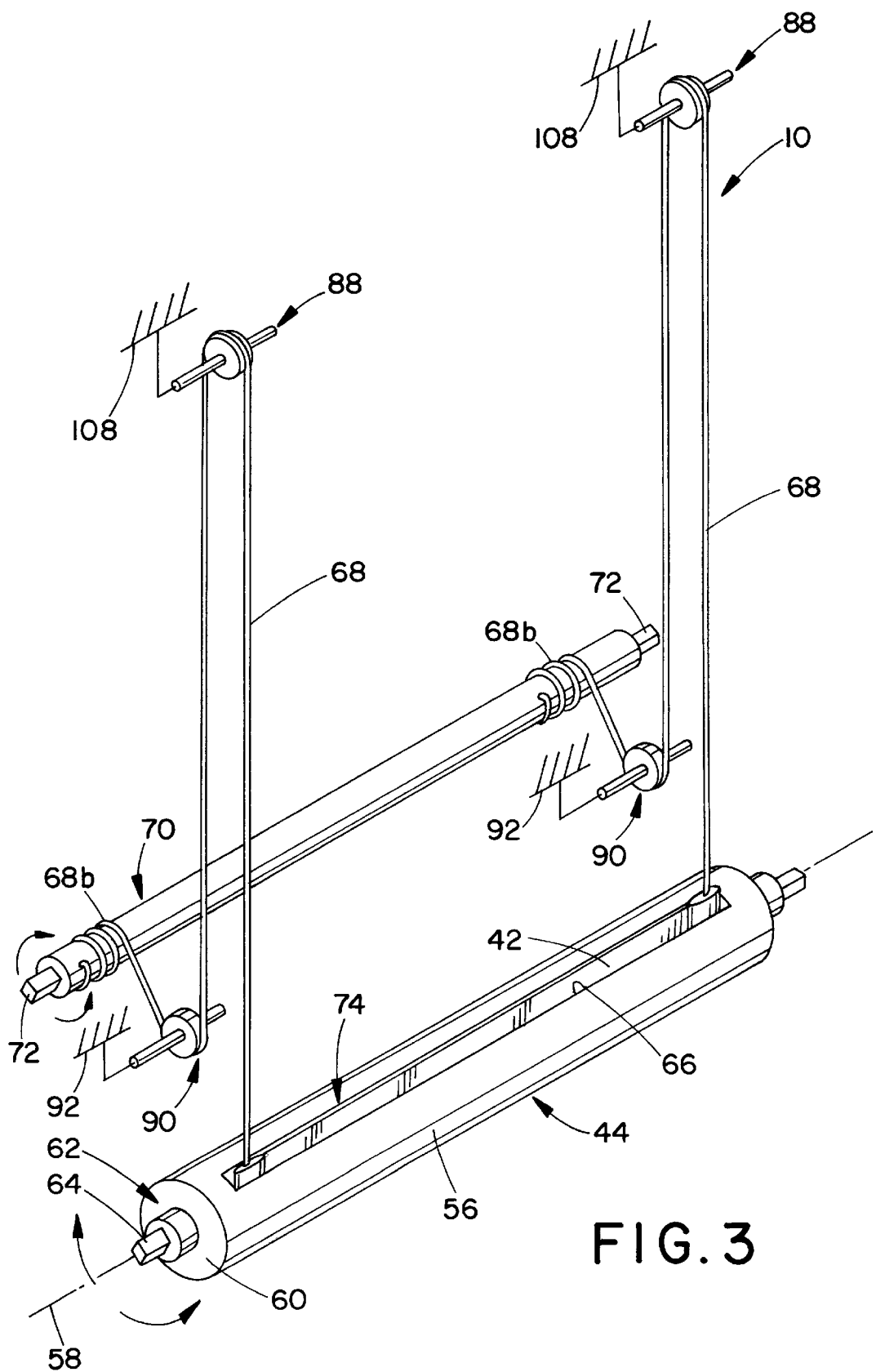
FIG. 3 is a perspective view schematically illustrating the container and inflatable bladder deploying and return arrangement for apparatus according to the invention.
Figure 4:
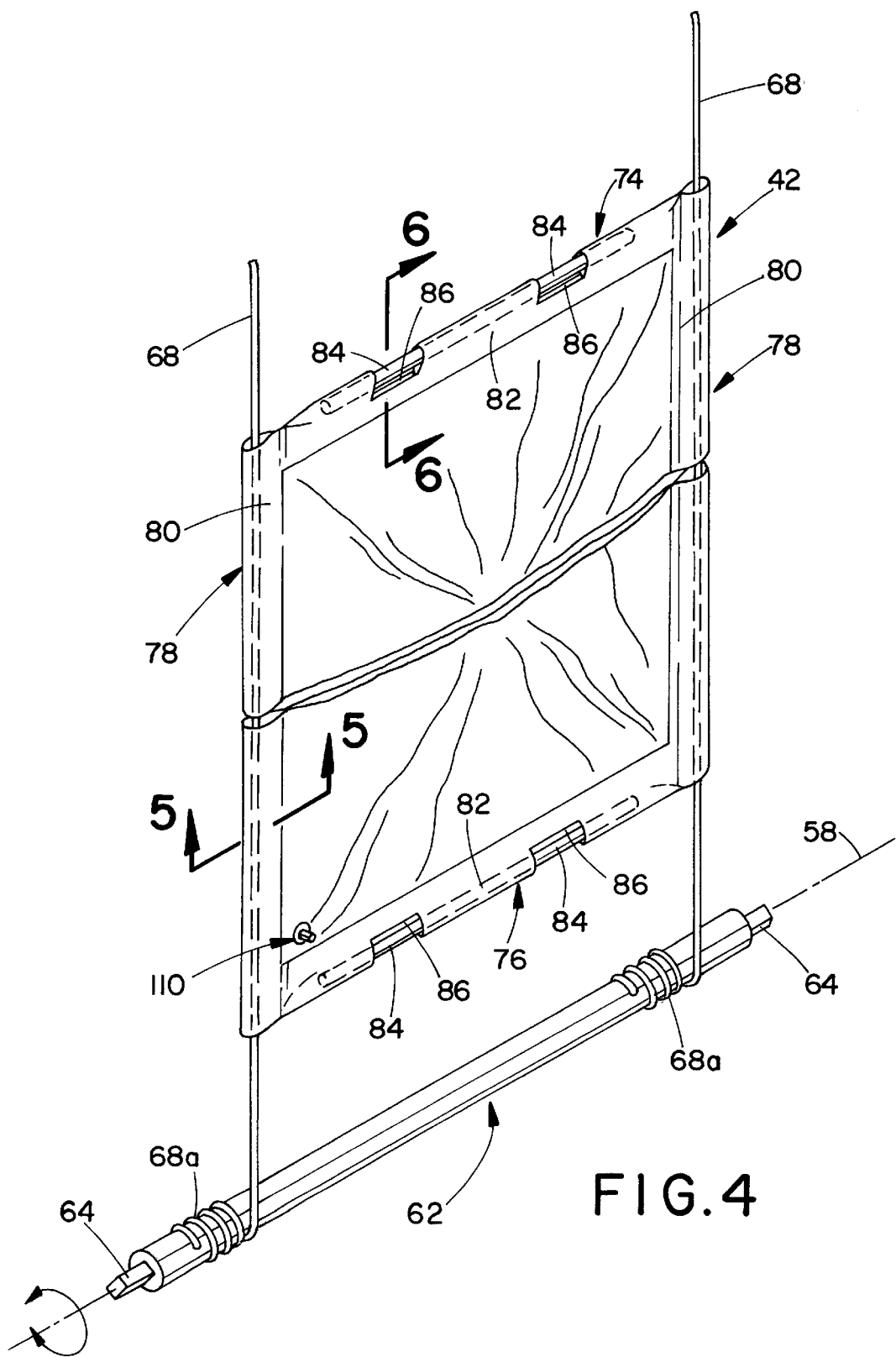
FIG. 4 is a perspective view schematically illustrating the inflatable bladder and cables by which the bladder is deployed and returned relative to the container.
Figure 5:
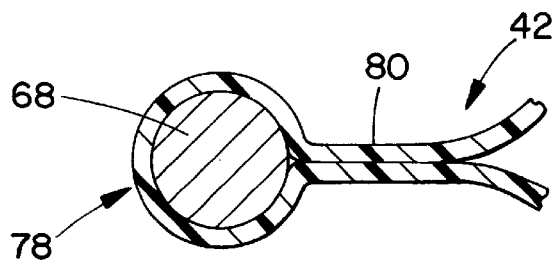
FIG. 5 is a cross-sectional view taken along Line 5—5 in FIG. 4.
Figure 6:
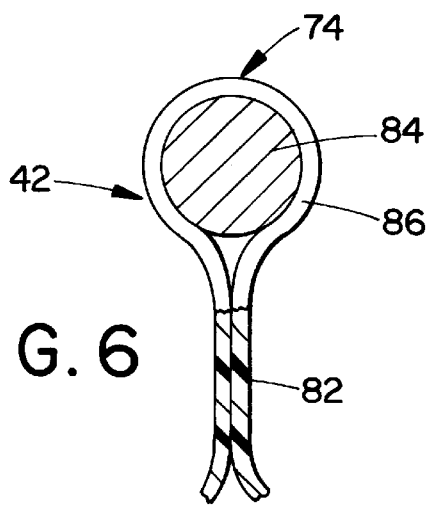
FIG. 6 is a cross-sectional view taken along Line 6—6 in FIG. 4.

In the embodiment illustrated, container 44 comprises a tubular body portion 56 having an axis 58 and end walls 60 at its axially opposite ends. End walls 60 support a shaft 62 for rotation in opposite directions about axis 58, and the axially outer ends of shaft 62 are provided with square stubs 64 for removably receiving a crank or other suitable tool by which the shaft is rotated for the purpose set forth hereinafter. Body portion 56 of container 44 is provided with an elongate narrow slot 66 between the axially opposite ends thereof, and inflatable bladder 42 is adapted to be displaced between its storage and deployed positions by a pair of cables 68, storage container shaft 62 and a cable winding shaft 70 extending between and rotatably supported by mounting plates 50. Shaft 70 has square stubs 72 at the axially outer ends thereof for receiving a suitable crank or other tool for rotating the shaft. As best seen in FIGS. 3 and 4 of the drawing, inflatable bladder 42 has leading and trailing ends 74 and 76, respectively, with respect to the direction of displacement thereof from container 44 to its deployed position, and opposite side edges 78 each of which extends about and is secured to the corresponding cable 68 against displacement relative thereto. It will be appreciated, of course, that the latter enclosure of cables 68 provides a margin 80 along the opposite sides which is sealed airtight so as to enable inflation of the bladder. As will be appreciated from FIG. 6 showing leading end 74 of inflatable bladder 42, both the leading and trailing ends are provided with a seam similar to that for the sides and including a sealed margin 82 which, together with side margins 80 provide a continuous peripheral seal for the inflatable bladder. For the purpose set forth hereinafter, the top and bottom seams enclose a rod member 84, and portions of the seams are cut away to provide windows 86 through which the rods are exposed and accessible. Cables 68 have inner ends 68a relative to container 44 which are suitably secured to shaft 62, such as by staking or welding. As will be appreciated from FIGS. 3 and 4, rotation of container shaft 62 clockwise in FIG. 4 results in the winding of cable ends 68a and inflatable bladder 42 onto shaft 62, thus to provide the storage position for the inflatable bladder. When container 44 is in the bladder deploying position thereof shown in FIG. 1 and bladder 42 is in its rolled up, stored position in the container, cables 68 extend upwardly through container slot 66 and about pulleys 88 anchored adjacent top edge 38 of the rear surface of the vehicle as described in greater detail hereinafter, and thence downwardly to pulleys 90 anchored on a cross member 92 of the vehicle crash bar and forwardly from pulleys 90 to cable shaft 70 at which the cable ends 68b are suitably secured such as by staking or welding. While not shown, it will be appreciated that pulleys 88 and 90 can be covered or enclosed so as to preclude lateral displacement of the cables therefrom. As will be appreciated from FIGS. 3 and 4, rotation of cable shaft 70 counterclockwise in FIG. 3 winds cables 68 thereonto and pulls inflatable bladder 42 upwardly through container slot 66 to the position shown in FIG. 4 with respect to shaft 62 and container 44 when the container is in the bladder deploying position thereof shown in FIG. 1. In this position, leading end 74 of bladder 42 is adjacent and parallel to top edge 38 of rear surface S of the vehicle, and trailing end 76 of the bladder is adjacent and parallel to bottom edge 40 of the rear surface.

Figure 2:
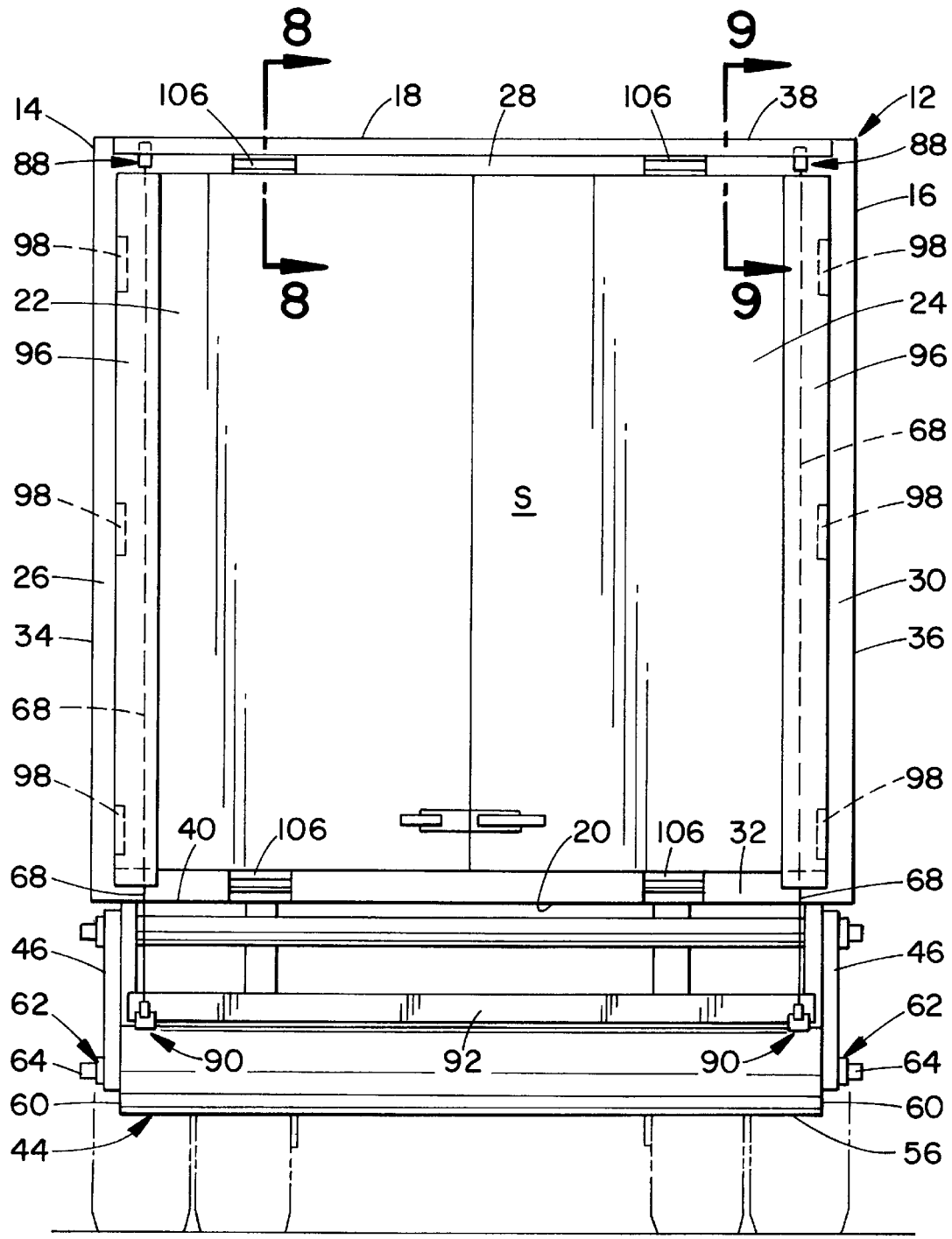
FIG. 2 is a rear elevation view of the trailer.
Figure 7:
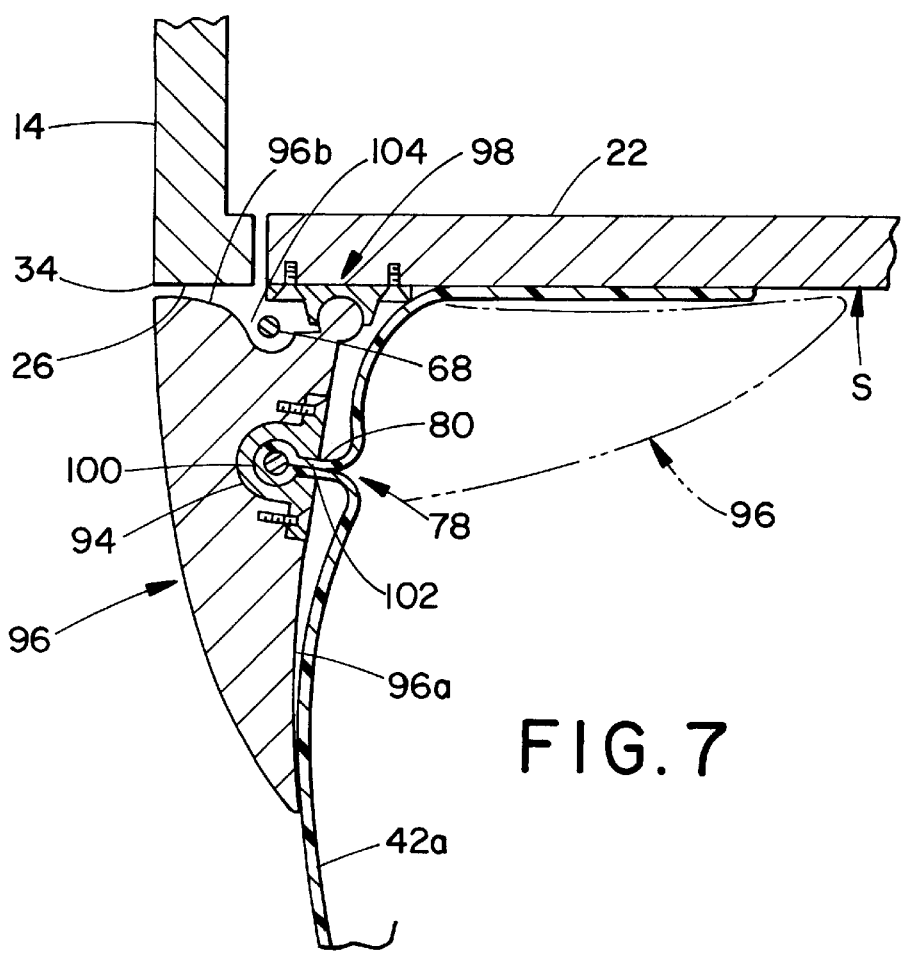
FIG. 7 is a cross-sectional view of a side fairing taken along Line 7—7 in FIG. 1.

In connection with displacement of inflatable bladder 42 from the stored to the deployed position thereof as described above, cables 68 and sides 78 of bladder 42 move upwardly in adjacent parallel relationship with vertical side edges 34 and 36 of the rear surface of the vehicle and, preferably, are supported and guided during such movement. In the embodiment illustrated, as best seen in FIG. 7, such support and guidance is provided by guide track components 94 provided in side fairings 96 which are pivotally mounted on doors 22 and 24 for displacement between use and non-use positions. In the use position, the fairings extend rearwardly from surface S as shown in FIG. 1 and by the solid line position of the fairing in FIG. 7, and in the non-use positions the fairings overlie the outer surface of the corresponding one of the trailer doors 22 and 24 as shown in FIG. 2 and by the broken line position of the fairing in FIG. 7. Fairings 96 are vertically coextensive with a corresponding one of the doors 22 and 24 and are pivotally mounted thereon by a corresponding plurality of hinge assemblies 98. Each of the guide track components 94 is mounted in a recess provided therefor on inner side 96a of the corresponding fairing and includes an inner, circular guide track 100 extending along the length of the guide component and having a narrow entrance 102 coextensive therewith and opening thereinto. As will be appreciated from the description hereinabove of the displacement of inflatable bladder 42 from the stored to the deployed position thereof, when the bladder is in the stored position and container 44 is in the bladder deploying position shown in FIG. 1, cables 68 extend upwardly through guide tracks 100, about upper pulleys 88 and then downwardly toward lower pulleys 90 and along cable recesses 104 between rear surface S of the vehicle and front side 96b of the fairing. As each cable 68 continues to move upwardly through the corresponding guide track, the corresponding side edge 78 of inflatable bladder 42 enters guide track 100 with marginal portion 80 of the bladder extending through entrance 102. Accordingly, it will be appreciated that when bladder 42 is in the deployed position thereof for inflation, side edges 78 are in the corresponding guide track 100 between the opposite ends thereof, whereby the sides of the bladder are supported against displacement relative to the fairings and rear surface S of the vehicle. As mentioned hereinabove, when bladder 42 is in the deployed position overlying rear surface S, the leading and trailing ends 74 and 76 thereof are respectively adjacent top edge 38 and bottom edge 40 of the rear surface and, in the embodiment illustrated, the leading and trailing ends of the bladder are adapted to be releasably secured against surface S. In this respect, as will be appreciated from FIGS. 2, 4 and 8 of the drawing, upper and lower peripheral frame portions 28 and 32 of rear surface S are provided with spring clips 106 suitably secured thereto in lateral alignment with windows 86 in the leading and trailing edges of inflatable bladder 42. Thus, as will be appreciated from FIG. 8, when bladder 42 is in the deployed position relative to surface S the leading and trailing ends can be pushed toward surface S for the portions of rods 84 exposed in windows 86 to engage with and be releasably held by a corresponding spring clip 106. A push-pull rod or other suitable device, not shown, can be employed to manually engage and disengage the leading and trailing ends of the inflatable bladder to achieve connection and disconnection with the spring clips.

Figure 8:
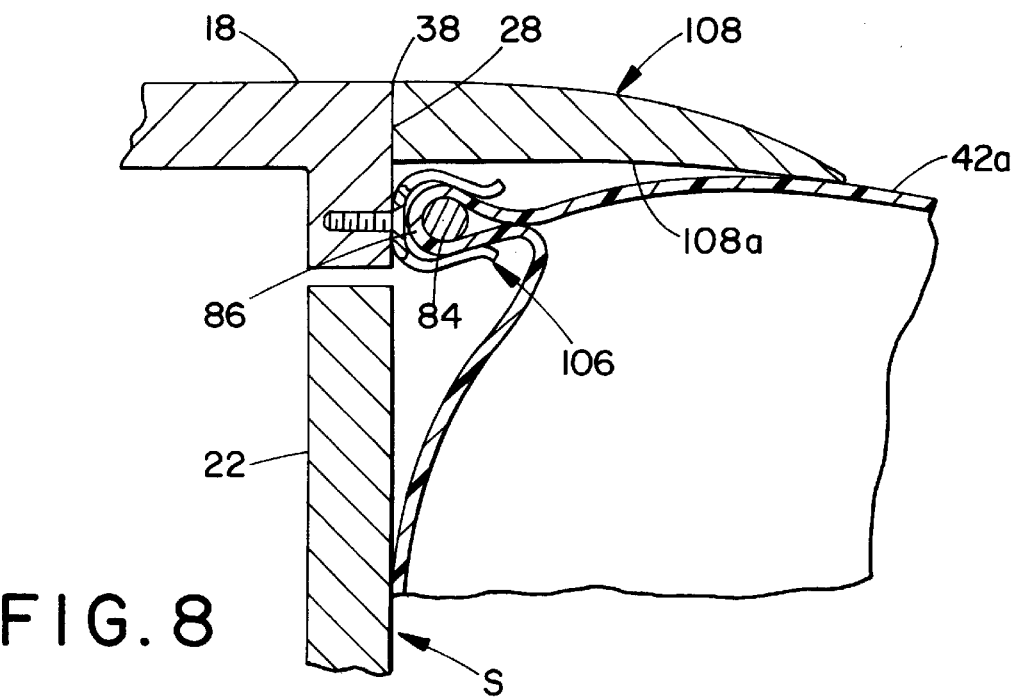
FIG. 8 is a cross-sectional view of the top fairing and a bladder retaining clip taken along Line 8—8 in FIG. 2.
Figure 9:
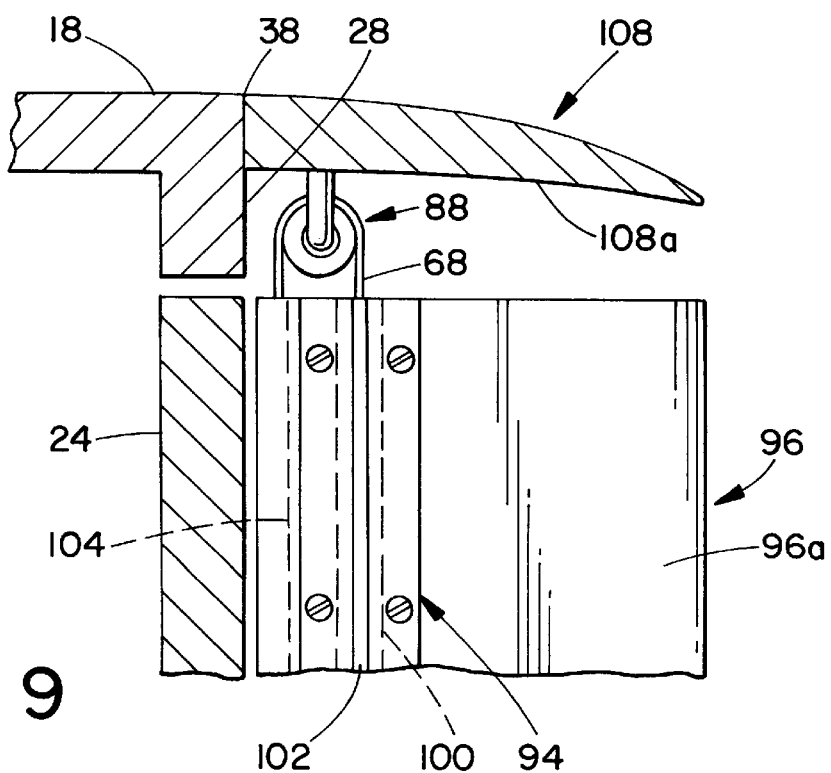
FIG. 9 is a cross-sectional view of the top fairing and a pulley for the bladder deploying and return cable taken along line 9—9 in FIG. 2.

Preferably, as shown in FIGS. 8 and 9, upper portion 28 of the trailer frame is provided with a top fairing 108 which extends laterally across top edge 38 and has opposite ends terminating in vertical alignment with inner sides 96a of fairings 96 when the latter are in the use positions thereof. In the embodiment illustrated, the underside 108a of top fairing 108 can be used to mount upper pulleys 88 of the bladder displacing arrangement, as shown in FIG. 9, although it will be appreciated that pulleys 90 could be mounted on frame portion 28. Similarly, while upper spring clips 106 are shown attached to frame portion 28 it will be appreciated that they could be mounted on underside 108a of top fairing 108. When bladder 42 is in the deployed position and secured relative to surface S as described above, it is adapted to be inflated so as to extend rearwardly from surface S and provide the aerodynamic contour for which it is designed. For this purpose, bladder 42 is provided with an inflating and deflating valve 110, as shown in FIG. 4, and the bladder can be inflated such as by using air under pressure from an onboard compressed air source such as that provided for operating the trailer brakes. As will be appreciated from FIGS. 1, 7 and 8 of the drawing, when inflatable bladder 42 is inflated to provide the aerodynamic profile for which it is designed, the bladder walls have outer surfaces 42a engaging against the inner sides 96a of fairings 96 and inner side 108a of fairing 108, and that the fairings have outer surfaces merging with the outer surface of the bladder to provide a smooth transition between the top and side edges of rear surface S and the inflated bladder. Furthermore, the length of cable 68 between trailing end 76 of bladder 42 and container shaft 62 is sufficient to enable the displacement of container 44 forwardly to the stowed position thereof shown by broken lines in FIG. 1 prior to or following inflation of bladder 42 so that the container is protected from exposure during use of the drag reducing apparatus. While not shown, it will be appreciated that container 44 can include a retractable or removable cover for closing slot 66 when bladder 42 is stored therein, or deployed, so as to optimize protection of the bladder and the interior of the container from the entry of dirt, rain and other foreign matter into the container. Further, while not shown, it will be appreciated that a ratchet mechanism, for example, can be provided between shaft 70 and one of the mounting plates 50 and between shaft 62 and container 44, to restrict rotation of shafts 62 and 70 when bladder 42 is deployed and inflated.

When it is desired to gain access to doors 22 and 24 of the vehicle, bladder 42 is deflated, the leading and trailing ends thereof are released from spring clips 106, storage container 44 is released and pivoted rearwardly from its stowed position to the bag deploying position, and container shaft 62 is rotated through the use of a crank or the like so as to wind cable ends 68a and thence bladder 42 onto shaft 62 until such time as the trailing end of the bladder moves into the container through slot 66 thereof. Container 44 is then released and returned to its stowed position beneath the vehicle, and side fairings 96 are pivoted inwardly to their non-use positions overlying the corresponding one of the vehicle doors. The doors can then be swung laterally outwardly of the sides of the trailer, and it will be appreciated that there is a sufficient length of cable 68 wrapped about cable shaft 70 to accommodate the foregoing displacements of the fairings and vehicle doors when the inflatable bladder is stored and the storage container is in its stowed position beneath the vehicle. It will likewise be appreciated that pulleys 88 are mounted for swiveling movement to accommodate the cable displacements with the fairings.

Figure 10:
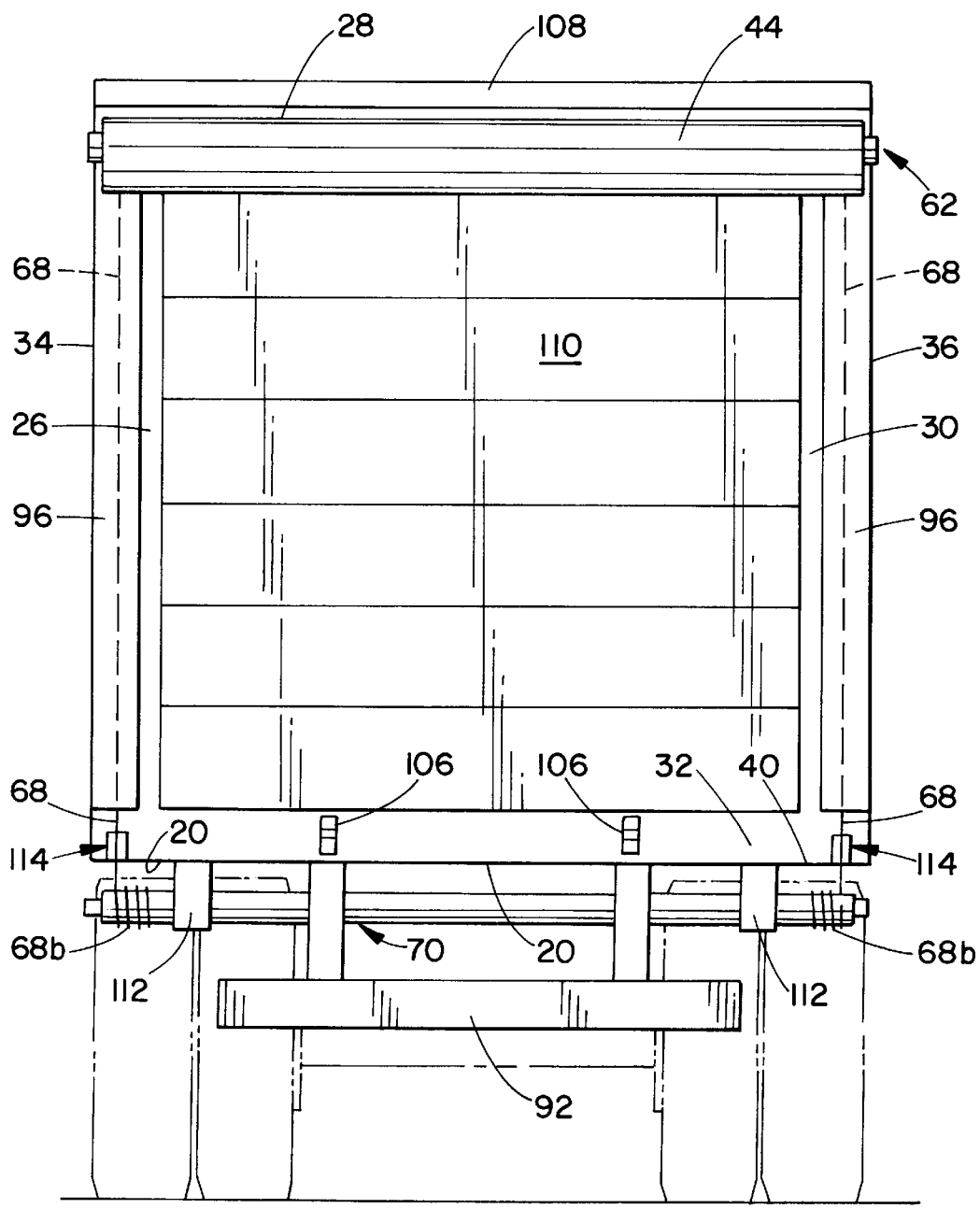
FIG. 10 is a rear elevation view of a trailer showing an alternative mounting arrangement for drag reducing apparatus according to the invention; and, FIG. 11 is a rear elevation view of a trailer showing yet another mounting arrangement for drag reducing apparatus according to the invention.

FIG. 10 illustrates another embodiment of the invention in which a majority of the component parts of the apparatus correspond to those described hereinabove, whereby like numbers appear in FIG. 10 to designate such component parts. In this embodiment, the rear surface of the vehicle is defined by peripheral frame portions 26, 28, 30, and 32 and a planar door surface provided by a roll-up door 110.

Inflatable bladder storage container 44 is mounted on top frame portion 28 in underlying relationship with respect to top fairing 108 and extends laterally between side edges 34 and 36 for the opposite ends of the container to overlie the upper ends of side fairings 96 such that cables 68 can extend downwardly through guide tracks 100 to cable winding shaft 70. Shaft 70 is rotatably mounted beneath bottom wall 20 of the vehicle by mounting members 112. Cable shaft 70 is positioned forwardly of the vehicle crash bar, and pulleys 114 are mounted adjacent bottom edge 40 of the rear surface of the vehicle for leading the lower ends of the cables forwardly to the cable shaft. Lower frame portion 32 is provided with a pair of spring clips 106, and it will be appreciated that the leading end of the inflatable bladder stored in container 44 is provided with windows as described hereinabove for attaching the leading end to the spring clips when the bladder is deployed. It will be appreciated that rotation of cable shaft 70 operates to pull the inflatable bladder downwardly from container 44 with support and guidance provided by support and guide components 94 as described hereinabove. In this embodiment, the trailing end of the inflatable bladder remains immediately inside the opening into storage container 44 for the container to support the latter end of the bladder against displacement relative to the rear surface of the vehicle. Return of the inflatable bladder to storage container 44 can be achieved by rotating storage container shaft 62 in the manner described hereinabove or, alternatively, by providing for cables 68 to be circuitous between shafts 62 and 70 such that rotation of shaft 70 in opposite directions would provide for displacing the inflatable bladder from and back to storage container 44.

Figure 11:
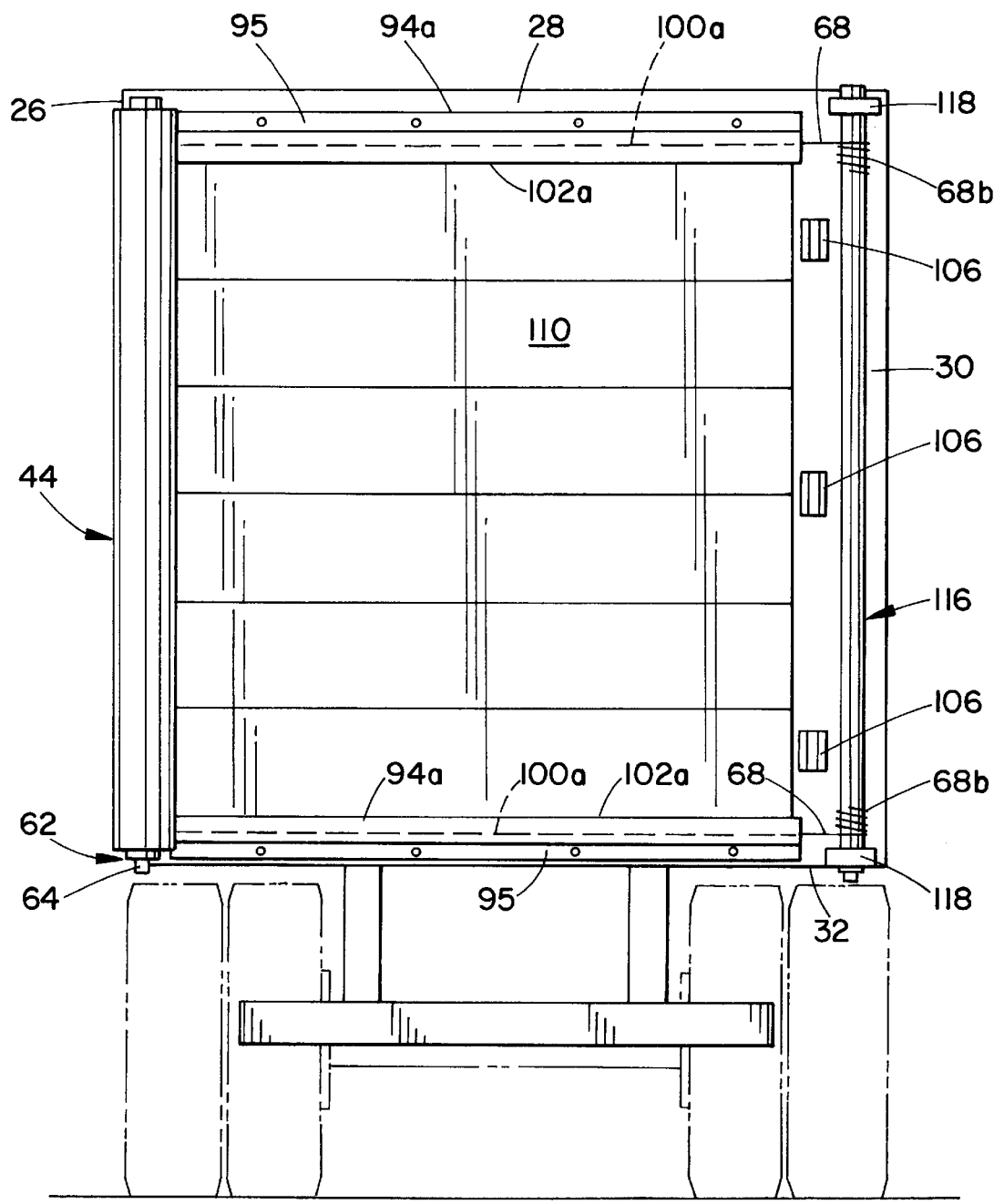

FIG. 11 illustrates another embodiment in which the inflatable bladder storage container 44 is mounted on side frame portion 26 of the peripheral frame at the rear of the vehicle which, like the embodiment of FIG. 10, includes a roll-up door 110. In this embodiment, cables 68 extend from storage container 44 when the inflatable bladder is stored therein and through guide and support components 94 which are mounted to extend laterally across the top and bottom frame portions 28 and 32, respectively. Ends 68b of the cables are secured to a cable shaft 116 which extends vertically along frame portion 30 and which is rotatably supported at the upper and lower ends thereof by support members 118. Spring clips 106 are also mounted on frame portion 30 for interconnection with the leading end of the inflatable bladder which, in this embodiment, would have three windows for attaching the leading end to the spring clips. As will be appreciated from the preceding embodiments, rotation of cable shaft 116 about its axis operates to wind cables 68 thereon and to pull the inflatable bladder from container 44 and across the rear surface of the vehicle with the sides of the bladder in support and guide components 94a. When it is desired to return the inflatable bladder to the storage container, the leading end is released from spring clips 106 and storage container shaft 62 is rotated to draw the inflatable bladder back into the container. While not shown, the side and top frame portions can be provided with fairings, either fixed or removably mounted thereon for engaging the outer side of the inflatable bladder when the latter is inflated.

While considerable emphasis has been placed herein on the structures and structural interrelationships between the component parts of preferred embodiments of the invention, it will be appreciated that many embodiments can be made and that many changes can be made in the embodiments herein illustrated and described without departing from the principles of the invention. In this respect, for example, it will be appreciated that motor driven arrangements can be provided for displacing the inflatable bladder between the stored and deployed positions thereof and for displacing the storage container between the bladder deploying and stowed positions thereof. Further, the cable and bladder support and guide components could be provided by slots directly in the fairings as opposed to inserts mounted on the fairings. Still further, inflating and deflating of the inflatable bladder can be automated and, while it is preferred to use fairings for smoothing the transition between the top and side walls of the rear end of the vehicle and the outer surface of the inflated bladder, such fairings are not essential. In this respect, in those embodiments in which the support and guide components are mounted on the fairings, the support and guide components could be otherwise mounted on the rear surface of the vehicle independent of the fairings. Still further in connection with such fairings, the latter can be fixed on the vehicle in the use positions thereof as opposed to being foldable to non-use positions, can be removably mounted on the vehicle and, in connection with the hinged mounting thereof, can be provided with arrangements for releasably locking the fairings in the use positions thereof. These and other modifications of the disclosed embodiments as well as other embodiments of the invention will be suggested and obvious to those skilled in the art, whereby it is to be distinctly understood that the foregoing descriptive matter is to be interpreted merely as illustrative of the invention and not as a limitation.

Having thus described the invention, it is claimed:

1. Drag reducing apparatus for a vehicle rear end having opposed pairs of parallel walls and a generally flat upwardly extending rear surface intersecting said walls to provide opposed pairs of parallel edges therewith, an inflatable bladder having opposite ends and opposite sides, a container on said vehicle, said bladder having a stored position in said container and a deployed position relative to said container for inflation, said bladder in said deployed position overlying said surface between said opposed pairs of parallel edges, said bladder when inflated providing an aerodynamic contour extending rearwardly of said surface, and means for displacing said bladder from said stored position to said deployed position.

2. Apparatus according to claim 1, further including means for displacing said bladder from said deployed position to said stored position.

3. Apparatus according to claim 1, and means on said vehicle for interengaging with and holding said opposite ends and said opposite sides of said bladder against rearward displacement relative to said surface.

4. Apparatus according to claim 1, wherein said vehicle includes fairings extending rearwardly of said surface, said bladder when inflated having outer surface portions along which said fairings extend.

5. Apparatus according to claim 1, wherein said container is adjacent one edge of one of said opposed pairs of edges, one of said opposite ends of said bladder being a leading end and the other a trailing end, and said means for displacing said bladder to said deployed position including means for pulling said leading end outwardly of said container and toward the other of the edges of said one of said opposed pairs of edges.

6. Apparatus according to claim 1, wherein one of said opposed pairs of edges include vertically spaced horizontally extending edges, said container being adjacent and parallel to one of said horizontal edges.

7. Apparatus according to claim 1, wherein one of said opposed pairs of edges includes horizontally spaced vertical edges, said container being adjacent and parallel to one of said vertical edges.

8. Apparatus according to claim 1, wherein said container includes a shaft rotatable about an axis parallel to one of said opposed pairs of parallel edges, said bladder in said stored position being wound on said shaft in the direction between said opposite ends of the bladder.

9. Apparatus according to claim 1, wherein said means for displacing said bladder from said stored position includes cables attached to said opposite sides of said bladder and having ends spaced from said container and attached to rotatable shaft means on said vehicle for winding said cables thereon to pull said bladder from the container.

10. Apparatus according to claim 1, wherein said container includes a shaft rotatable about an axis parallel to one of said opposed pairs of parallel edges, said bladder in said stored position being wound on said shaft in the direction between said opposite ends of the bladder, said bladder in said deployed position being unwound from said shaft, and means to rotate said shaft for winding said bladder thereonto.

11. Apparatus according to claim 1, wherein said opposed pairs of parallel walls include vertically spaced top and bottom walls and horizontally spaced side walls therebetween and said opposed pairs of parallel edges include top and bottom edges between said side walls and vertical side edges between said top and bottom walls, said container extending parallel to said bottom edge and being mounted on said vehicle for displacement between a stowed position beneath said bottom wall and a bladder deploying position rearwardly of said bottom edge.

12. Apparatus according to claim 11, wherein said container includes a first shaft rotatable about an axis parallel to said bottom edge, one of said opposite ends of said bladder being a bottom end and the other being a top end, and means connecting said bottom end to said first shaft for rotation of said first shaft in one direction about said axis to wind said bladder thereon in the direction from said bottom end toward said top end.

13. Apparatus according to claim 12, wherein said means connecting said bottom end of said bladder to said first shaft includes cables extending along and secured to said opposite sides of said bladder and having inner ends fastened to said first shaft, said cables extending from said top end of said bladder and having outer ends attached to rotatable second shaft means on said vehicle for winding said cables thereon in the direction from the outer ends thereof toward the inner ends for displacing said bladder from the stored to the deployed position.

14. Apparatus according to claim 13, wherein said vehicle includes guide means for said cables and sides of said bladder, said guide means extending parallel to said vertical side edges of said vehicle between said top and bottom edges.

15. Apparatus according to claim 14, wherein said vehicle includes side fairings extending rearwardly of said surface along each of said vertical side edges and a top fairing extending along said top edge, said bladder when inflated having outer surface portions along which said fairings extend.

16. Apparatus according to claim 15, wherein said side fairings are mounted on said vehicle for pivotal displacement between use and non-use positions in which said fairings respectively extend rearwardly of said surface and overlie said surface.

17. Apparatus according to claim 16, wherein each of said side fairings in the use position has an inner side facing laterally inwardly of the corresponding vertical edge, said guide means including a guide track in the inner side of each fairing.

18. Apparatus according to claim 17, wherein said top and bottom ends of said bladder in the deployed position are respectively adjacent and parallel to said top and bottom edges of said vehicle, and means on said vehicle interengaging with said top and bottom ends of the bladder to hold said ends against rearward displacement from said surface.

* * * * *